US012228533B2

(12) United States Patent
Castell et al.

(10) Patent No.: US 12,228,533 B2
(45) Date of Patent: Feb. 18, 2025

(54) SENSOR COMPONENT AND PROCESS FOR PRODUCING SENSOR COMPONENT USING ELECTROPOLYMERIZATION

(71) Applicant: Oxford University Innovation Limited, Oxford (GB)

(72) Inventors: Martin Castell, Oxford (GB); Krishnan Murugappan, Oxford (GB); Merel Lefferts, Oxford (GB); Ben Armitage, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 177 days.

(21) Appl. No.: 17/787,707

(22) PCT Filed: Dec. 21, 2020

(86) PCT No.: PCT/GB2020/053321
§ 371 (c)(1),
(2) Date: Jun. 21, 2022

(87) PCT Pub. No.: WO2021/130477
PCT Pub. Date: Jul. 1, 2021

(65) Prior Publication Data
US 2023/0031121 A1    Feb. 2, 2023

(30) Foreign Application Priority Data

Dec. 23, 2019 (GB) ..................... 1919172

(51) Int. Cl.
*G01N 27/12* (2006.01)
*C08F 34/00* (2006.01)
*C09D 5/44* (2006.01)

(52) U.S. Cl.
CPC ........... *G01N 27/126* (2013.01); *C08F 34/00* (2013.01); *C09D 5/4407* (2013.01); *C09D 5/4476* (2013.01)

(58) Field of Classification Search
CPC ..... G01N 27/126; C08F 34/00; C09D 5/4407; C09D 5/4476
See application file for complete search history.

(56) References Cited

U.S. PATENT DOCUMENTS 8,443,647 B1* 5/2013 Kolmakov ......... G01N 33/0034
                                          73/1.02
2009/0294303 A1* 12/2009 Fischer .................. B82Y 15/00
                                          977/762

(Continued)

FOREIGN PATENT DOCUMENTS

WO   2006/042276 A2   4/2006
WO   2014/162148 A2   10/2014

OTHER PUBLICATIONS

International Search Report and Written Opinion for WO 2021/130477 (PCT/GB2020/053321), dated Apr. 12, 2021, pp. 1-12.

(Continued)

*Primary Examiner* — Dominic E Hawkins
(74) *Attorney, Agent, or Firm* — Thomas|Horstemeyer, LLP

(57) ABSTRACT

A process for producing a sensor component for detecting an analyte; a sensor component producible by the process; a process for detecting an analyte; and a device comprising the sensor component.
The process comprises electrochemically growing a plurality of conducting polymer molecules from a monomer electrolyte solution to provide a percolation network.
The plurality of conducting polymer molecules are grown on the surface of an insulating substrate to connect a first (Continued)

electrode to a second electrode and are capable of displaying a change in an electrical property in response to interaction with an analyte A plurality of conductive nodes may be disposed on a surface of the insulating substrate.

A potentiostatic method or a galvanostatic method may be employed to grow the plurality of conducting polymers. Chronoamperometry may be employed to electrochemically grow the plurality of conducting polymers. Cyclic voltammetry is not employed to grow the plurality of conducting polymers.

18 Claims, 7 Drawing Sheets

(56) References Cited

U.S. PATENT DOCUMENTS

| | | | | |
|---|---|---|---|---|
| 2011/0045601 | A1* | 2/2011 | Gryska | G01N 27/221 422/82.01 |
| 2011/0171629 | A1* | 7/2011 | Swager | G01N 33/54346 977/773 |
| 2017/0370918 | A1* | 12/2017 | Cash | G01N 33/5438 |
| 2018/0199873 | A1* | 7/2018 | Wang | A61B 5/14546 |
| 2019/0261907 | A1* | 8/2019 | Brister | A61B 5/14865 |

OTHER PUBLICATIONS

UK Search Report for GB 1919172.5, dated Jun. 22, 2020, pp. 1-4.
Belkessam Celia et al: "Cyclic voltammetry and galvanostatic effect on prepared Polypyrrole/Ni0.3Co2.704 for O2 electrocatalysis", Materials Research Express, vol. 6, No. 12, Dec. 12, 2019 (Dec. 12, 2019), p. 125097.
Electrochimica Acta, vol. 52, 2006, K Xu et al, "Effects of dopants on percolation behaviours and gas sensing characteristics of polyaniline film", pp. 723-727.
Merel J. Lefferts, "Electrical percolation through a discontinuous Au nanoparticle film", Applied Physics Letters 112, 251602 (2018), pp. 1-4.
Krishnan Murugappan et al., "Bridging electrode gaps with conducting polymers around the electrical percolation threshold", Electrochemistry Communications 87 (2018) 40-43, pp. 1-4.

* cited by examiner

SENSOR COMPONENT AND PROCESS FOR PRODUCING SENSOR COMPONENT USING ELECTROPOLYMERIZATION

CROSS-REFERENCE TO RELATED APPLICATIONS

This application is the National Stage of International Application No. PCT/GB2020/053321, filed Dec. 21, 2020, which claims priority to GB 1919172.5, filed Dec. 23, 2019, which are entirely incorporated herein by reference.

FIELD OF THE INVENTION

The present invention relates to a sensor component for detecting an analyte and a process for producing a sensor component. The invention also relates to a device comprising a sensor component, and its use to detect an analyte.

BACKGROUND OF THE INVENTION

High sensitivity sensing has a variety of uses, such as continuous monitoring of the local environment for the presence of toxic gasses that are harmful to health. For example, carbon monoxide is an odourless and potentially lethal gas, and so carbon monoxide detectors are routinely installed in homes. Similarly, sensors for the detection of toxic hydrogen sulphide are required in some industrial environments.

A further application is for the identification of the location of drugs or explosive materials, such as TNT or ammonium nitrate mixed with fuel oil (ANFO), through the sensing of the emission of volatile compounds associated with these substances. This function is frequently carried out by trained sniffer dogs whose olfactory sense and mobility allows them to detect contraband substances and then move towards them to locate them.

The third way that high sensitivity gas sensing is increasingly being used is for the identification of diseases via volatile organic compounds emitted in exhaled breath which contains more than 500 compounds at trace levels. Some of these trace gasses can be used as disease markers, for example to identify lung cancer, diabetes, and kidney disease.

Current technology for the measurement of low analyte concentrations in the environment use gas sensor devices based on optical absorption, chromatography and spectrometry, or other optical probes such as plasmons. These instruments have impressive molecular sensitivity and specificity capabilities. However a significant drawback is that they are large, expensive, delicate, and have slow response times. Simple chemiresistive sensing devices are an attractive alternative because they are small, cheap, robust, and generally have fast response times. Chemiresistors have a sensing layer between two electrodes on an insulating substrate. A change in the resistance of the sensing layer caused by an interaction with the analyte is monitored and provides a measure of the amount of analyte in the atmosphere. The drawback is their relatively poor sensitivity and selectivity.

Bartlett et al (Sensors and Actuators, 19 (1989 125-140; 141-150;) describes the formation of a conducting polymer gas sensor. Potential cycling is employed to generate a polypyrrole film between electrodes separated by an insulating layer (12 μm).

SUMMARY OF THE INVENTION

According to a first aspect of the invention there is provided a process for producing a sensor component for detecting an analyte, the process comprising providing an insulating substrate disposed between a first electrode and a second electrode;
providing a monomer electrolyte solution, the monomer electrolyte solution comprising a plurality of monomer molecules capable of electrochemical growth to form a plurality of conducting polymer molecules;
electrochemically growing a plurality of conducting polymer molecules from the monomer electrolyte solution, the plurality of conducting polymer molecules being grown on the surface of the insulating substrate to connect the first electrode to the second electrode and being capable of displaying a change in an electrical property in response to interaction with an analyte; and
ceasing electrochemical growth of the conductive polymer molecules to provide a percolation network,
wherein (i) a potentiostatic method or a galvanostatic method is employed to grow the plurality of conducting polymers; or (ii) cyclic voltammetry is not employed to grow the plurality of conducting polymers.

The invention also resides in a sensor component producible by the process of the first aspect. The process of the first aspect may be employed to prepare the sensor component of the second aspect.

According to a second aspect of the invention there is provided a sensor component for detecting an analyte comprising a first electrode and a second electrode;
an insulating substrate disposed between the first electrode and the second electrode;
a plurality of conducting polymer molecules, the conducting polymer molecules being capable of displaying a change in an electrical property in response to interaction with an analyte;
the plurality of conducting polymer molecules forming a percolation network that electrically connects the first electrode to the second electrode;
wherein at least 90% of the plurality of conducting polymer molecules are electrically connected to the first electrode and/or the second electrode.

According to a third aspect of the invention there is provided a process for detecting an analyte, the process comprising exposing a sample to a sensor component, the sensor component comprising a first electrode and a second electrode;
an insulating substrate disposed between the first electrode and the second electrode; a plurality of conducting polymer molecules, the conducting polymer molecules being capable of displaying a change in an electrical property in response to interaction with an analyte;
the plurality of conducting polymer molecules forming a percolation network that electrically connects the first electrode to the second electrode and at least 90% of the plurality of conducting polymer molecules being electrically connected to the first electrode and/or the second electrode; and
measuring a change in an electrical property of the percolation network.

As discussed above, the reliable detection of low concentrations of gasses with high sensitivity and selectivity is critical for applications ranging from industrial and domestic environments, to medical, security, and military settings. Existing sensor technologies based on optical absorption or chromatography and spectrometry use detectors that are large, expensive, and delicate. Alternatively, electrochemical gas sensors based on metal oxide sensing layers are robust and relatively cheap, but they are constrained by their limits of sensitivity and selectivity. The present invention employs a network of electrochemically-grown conducting polymers as a high-sensitivity chemiresistive gas sensor. The examples demonstrate how doped polypyrrole connections are grown, resulting in an electrical percolation network. The degree of network connectivity determines the sensitivity of the sensor. In one embodiment, an optimised percolation network is provided with a limit of detection (LOD) of 18±2 ppb of ammonia in a dry nitrogen carrier gas with a response time of a few seconds.

Conducting polymer (CP) chemiresistors are usually created as thin film devices. In the present invention electropolymerisation (electrochemical growth of polymer) is stopped before a thin film is formed. The inventors have changed the film architecture to create a percolation network of polymers and thereby improve sensitivity. This increased sensitivity is achieved because when an analyte interacts with any part of the polymer chain the conductivity of the whole conducting pathway is disrupted. An electrical percolation network is a lattice of randomly distributed conducting and insulating regions. If there are very few conducting regions then no charge can flow through the network because there will be no continuous conducting pathway from one side of the network to the other (FIG. 1a). As the proportion of conducting elements is increased, the probability increases that a conducting pathway is formed. This critical point is called the percolation threshold. The conductivity of the networks changes most rapidly just beyond the percolation threshold, as shown schematically in FIG. 1b (the derivative of FIG. 1a).

The shape of the percolation curve in FIG. 1a depends on many factors, but the threshold onset in conductivity followed by a rapid increase is common to all these curves. This invention creates a conducting polymer percolation network that takes advantage of this region of high sensitivity. Although FIG. 1b shows that the sensitivity is greatest at the percolation threshold, the inventors propose taking into account the degree to which this sensitivity can be exploited within a device setting and therefore consider the effect of electrical noise; a device with high sensitivity may be of little use if the signal to noise ratio (SNR) is too low. As an estimate of the noise level the inventors propose the square root of the signal level. The sensitivity (FIG. 1b) multiplied by the SNR is shown in FIG. 1c and demonstrates that the most useful region for device applications is slightly beyond the percolation threshold. This is the region of the percolation curve that the inventors propose to exploit for optimal sensor performance, i.e. where the gradient is steep, but the conductance is high enough to be able to obtain a measurement that is not buried in noise.

The process of the present invention is surprisingly effective, in comparison to other methods employing conducting polymers, such as thermal evaporation, dip-coating, drop casting and spin-coating.

Thermal evaporation is limited to small molecules/oligomers, eliminating a large range of conductive polymers. While thermal evaporation can be employed to yield thin films of the order of a few nm, this is still thicker than a percolation network obtained using the process of the invention. Furthermore the layers tend to dewet under ambient conditions.

Dip coating allows for slightly more control than thermal evaporation, but does not yield an effective percolation network.

Drop casting does not provide enough control, resulting in relatively thick and non-uniform layers.

The inventors investigated spin coating, but found it less effective than the process of the invention. It was possible to create ~4-6 nm thick films with pin holes using spin-coating but a comparison of such films on substrates with and without Au nanoparticles showed no difference between the two. As such, this suggests that despite being significantly thinner than films achieved with thermal deposition, a spin-coated film is still too thick in comparison to the thickness of the Au nanoparticles. The film behaves like a conventional CP film rather than a percolation network.

WO2014/162148 describes the preparation of an electrical percolation network, which is different from the present invention. WO2014/162148 describes a substrate having a network of gold nodes and the deposition of alpha-sexithiophene oligomers onto the substrate by thermal evaporation from a tungsten boat. Alpha-sexithiophene is capable of forming a chemical bond with the gold nodes or an electrode. It will be appreciated that the alpha-sexithiophene oligomers will be deposited onto the surface of the substrate in a random manner, and be subject to interfacial tension and contact resistance on the substrate. If enough molecules are deposited, at least one continuous pathway is created which connects the first electrode to the second electrode and this is demonstrated by a reduction in resistance. However, it may be necessary to deposit an excess of oligomers before a pathway is achieved, resulting in a thicker film is desirable. Moreover, very many of the molecules will not bond to an electrode or a node and will be redundant, and may be described as "orphan" molecules. If an analyte contacts such "orphan" molecules, it will not be detected. The thermal evaporation method is limited to small molecules/oligomers, and is not suitable for a large range of conducting polymers.

Murugappan et al. (Electrochemistry Communications 87 (2018) 40-43, describes the preparation of an electrical percolation network, which is different from the present invention. Murugappan et al. describes the electrochemical growth of poly(3,4-ethylenedioxythiophere) (PEDOT) using cyclic voltammetry (CV). The potential between a working and reference electrode was swept between a low value and a high value. When sufficiently high potentials are reached, EDOT is oxidised to form PEDOT. At low potential, PEDOT is reduced to form EDOT. Slightly more PEDOT is created than destroyed, in each cycle such that the PEDOT slowly builds up to form a percolation network. The creation and destructions of PEDOT does not yield a reliable percolation network. At least some of the PEDOT molecules can be viewed as "orphan" molecules, which are not electrically connected to either electrode. As such, the percolation network is less efficient that that obtained with the present invention since many PEDOT polymers will be redundant.

Electrochemical Growth

The conducting polymer molecules are electrochemically grown from the monomer electrolyte solution, i.e. in situ polymerisation. This ensures low contact resistance between the polymer and the electrodes. The electopolymerisation may be carried out at SATP (standard ambient temperature and pressure, 25° C. and 100 kPa).

The monomer molecules may be oxidised to generate the conducting polymer. Typically, a potential is applied to the electrode (the first and/or second electrode) and held at a fixed value, which corresponds to the monomer oxidation potential, for a certain period. The longer the potential is applied, the more the polymer grows. The monomers are oxidised to form the conducting polymer, such that the percolation network is created; there is no reduction of the polymer.

It will be understood that the monomer and resulting conducting polymer, along with any oligomers formed during polymerisation will all have different oxidation potentials. As such, the inventors propose electropolymerization potential as a more useful term.

A potential of +0.5V or more, +1.0V or more, +1.5V or more or +2.0V or more may be applied to the first electrode and/or second electrode and/or a potential of +10V or less, +5V or less or +3V or less may be applied to the first and/or second electrode. For example, a potential of from +0.5V to +10V may be applied to the first electrode and/or the second electrode to effect polymerisation.

The potential may be applied for a period of at least 10 seconds, at least 30 seconds, at least one minute, at least 5 minutes, at least 30 minutes, at least one hour, at least 3 hours or at least 12 hours and/or the potential may be applied for a period of 1 week or less, 3 days or less, 24 hours or less, 12 hours or less, 6 hours or less, 2 hours or less, 1 hour or less, 30 minutes or less, 10 minutes or less, 3 minutes or less or 60 seconds or less.

The average potential over the period may be determined. For example, if a potential of +0.6V is applied for 1 minute and a potential of +0.8V for 1 minute, then the average will be +0.7V. For example, if a potential of +0.6V is applied for one minute and a potential of −0.6V is applied for one minute, then the average will be 0V.

The plurality of conducting polymer molecules may be partially oxidised or partially reduced to yield a plurality of doped conducting polymer molecules. Typically, the substrate is exposed to an electrolyte solution that does not contain any monomers and a potential is applied for a fixed period.

A potential of +0.5V or more, +1.0V or more, +1.5V or more or +2.0V or more may be applied to the first and/or second electrode and/or a potential of +10V or less, +5V or less or +3V or less may be applied to the first and/or second electrode. For example, a potential of from +0.5V to +10V may be applied to the first electrode and/or the second electrode in order to dope the polymer.

The potential may be applied to dope the polymer for a period of at least 10 seconds, at least 30 seconds, at least one minute, at least 5 minutes, at least 30 minutes, at least one hour, at least 3 hours or at least 12 hours and/or the potential may be applied for a period of 1 week or less, 3 days or less, 24 hours or less, 12 hours or less, 6 hours or less, 2 hours or less, 1 hour or less, 30 minutes or less, 10 minutes or less, 3 minutes or less or 60 seconds or less.

The monomer electrolyte solution may comprise pyrrole (oxidation potential of 0.8V) and electrochemical growth may be effected by applying a potential of at least 0.8V, such as around IV for a fixed period, such as from 10 to 60 seconds. The resulting polypyrrole can then be doped by applying a potential, such as around IV, for a fixed period, such as 20 to 120 seconds.

The plurality of conducting polymer molecules may be electrochemically grown using a potentiostatic method (e.g. chronoamperometry) or a galvanostatic method (e.g. chronopotentiometry). Potentiostatic and galvanostatic methods are polarization techniques that allow for the controlled polarization of an anode. For chronoamperometry, an electrode potential may be held at the oxidation potential of the monomer for a fixed period.

The plurality of conducting polymer molecules are not grown by cyclic voltammetry (CV) as discussed above. CV provides discontinuous growth and leads to "orphan" molecules that are not part of the percolation network. The plurality of conducting polymer molecules may not be grown using any potentiodynamic method (including cyclic voltammetry) and/or may not be grown using a galvanodynamic method. Such methods do not provide continuous growth.

Monomer Electrolyte Solution

The monomer electrolyte solution comprises a plurality of monomer molecules capable of electrochemical growth to form a plurality of conducting polymer molecules.

The plurality of monomer molecules may comprise a phenylene, a vinylene, an acetylene, an azulene, a naphthalene, a pyrene, an aniline, a fluorene, a pyrrole, a thiophene, a carbazole, an indole, an azepine, or a mixture thereof.

The monomer electrolyte solution may be described with reference to the concentration of the monomer(s) therein (measured at standard ambient temperature and pressure, SATP, 25° C. and 100 kPa). The monomer electrolyte solution may have a monomer concentration of from 0.01M (moles per litre), 0.05M, 0.1 M or 0.2 M and/or the monomer electrolyte solution may have a monomer concentration of 10 M or less, 5 M or less or 1 M or less.

The monomer electrolyte solution comprises a solvent.

The solvent may be an organic solvent, which may be protic or aprotic. Common polar aprotic organic solvents include tetrahydrofuran (THF), ethyl acetate, acetone, dimethylformamide (DMF), acetonitrile, dimethyl sulfoxide (DMSO), and nitromethane. Common protic organic solvents include formic acid, ethanol, methanol, acetic acid, and propanal.

The solvent may comprise water (a polar protic solvent), i.e. the monomer electrolyte solution may comprise an aqueous solution.

The monomer electrolyte solution may be obtained by dissolving an electrolyte in a polar solvent. The electrolyte may be selected from one or more of an acid, a base, or a salt. Electrolytes include $H_2SO_4$, HCl, oxalic acid, lithium chlorate ($LiClO_4$), sodium chloride (NaCl), sodium or potassium nitrate ($NaNO_3$ or $KNO_3$), sodium tartrate, tetrabutylammonium hexafluorophosphate ($NBu_4PF_6$), tetrabutylammonium perchlorate (TBAP), and boron trifluoride diethyl etherate.

The monomer electrolyte solution may comprise $LiClO_4$/$CH_3CN$ or saline solution (an aqueous NaCl solution).

The monomer electrolyte solution may be described with reference to the concentration of electrolyte therein (measured at SATP). The monomer electrolyte solution may have a electrolyte concentration of from 0.01M (moles per litre), 0.05M, 0.1 M or 0.2 M and/or the monomer electrolyte solution may have an electrolyte concentration of 10 M or less, 5 M or less or 1 M or less.

TABLE 1 contains examples of monomer electrolyte solutions and the associated potential required for potentiostatic electropolymerisation.

| Monomer (conc.) | Electrolyte Solution | Substrate | Potentiostatic Electropolymerisation Potential (V) | Ref. |
|---|---|---|---|---|
| Aniline (0.1M) | $H_2SO_4$ (0.5M aq.) | Stainless steel | 0.8-1.1 | (1) |
| Aniline (0.05M) | $H_2SO_4$ (1M aq.) | Stainless steel | 0.75 | (2) |
| Aniline (0.1-0.3M) | HCl (1.5M aq.) | ITO | 0.8-1.1 | (3) |
| Aniline (0.12M) | Oxalic acid (0.5M aq.) | Al2024 T6 Alloy | 1.7-1.9 | (4) |
| EDOT (0.01M) | $H_2SO_4$ (0.1M aq.) | Stainless steel | 0.8-1.2 | (5) |
| EDOT (0.01M) | $H_2SO_4$ (0.1M aq.) | Toray carbon paper foil | 0.9 | (6) |
| EDOT (0.02-0.2M) | ACN/TBAP (0.1M) | Pt disc | 1.25-1.4 | (7) |
| EDOT (0.01M) | $LiClO_4$ (0.1M aq.) | Pt disc | 0.8-1.5 | (8) |
| Pyrrole (0.1-0.5M) | NapTS (0.1M aq.) | ITO coated glass | 0.8 | (9) |
| Pyrrole (0.05M) | $KNO_3$ (0.1M aq.) | Stainless steel | 0.9 | (10) |
| Pyrrole (0.5M) | $NaNO_3$ (0.01-1M) | Aluminium | 0.7-1.15 | (11) |
| Pyrrole (0.5M) | Sodium Tartrate (0.2M) | Copper/brass | 0.8 | (12) |
| Thiophene (0.3M) | Boron trifluoride diethyl etherate | Stainless steel | 1.3 | (13) |
| Thiophene (0.6 mM) | $ACN/TBAPF_6$ (0.1M) | FTO coated glass | 1.9 | (14) |
| Thiophene (0.02M) | $ACN/(CH_3)_4NBF_4$ (0.02M) | FTO glass | 3.0 | (15) |
| Thiophene (0.02M) | Boron trifluoride diethyl etherate | ITO/gold | 1.3 | (16) |

FTO = fluorine doped tin oxide,
ITO = Indium tin oxide
References:
(1) Sazou D., Kourouzidou M., Pavlidou E., Electrochim Acta., 2007, 52(13), 4385-97
(2) Gupta V., Miura N., Electrochem. Commum., 2005, 7(10), 995-9.
(3) Kim E., Kang N., Moon J. J., Choi M., Bull. Korean. Chem. Soc., 2016, 37(9), 1445-52
(4) Karpagam V., Sathiyanarayanan S., Venkatachari G., Curr. Appl. Phys., 2008, 8(1), 93-8.
(5) Yang Z., Peng H., Wang W., Liu T., J Appl. Polym. Sci., 2010, 116(5), 2658-67.
(6) Patra S., Munichandraiah N., Langmuir. 2009, 25(3), 1732-8.
(7) Randriamahazaka H., Noël V, Chevrot C., J. Electroanal. Chem. 1999, 472(2), 103-11.
(8) Du X, Wang Z., Electrochim Acta., 2003, 48(12), 1713-7.
(9) Lim Y. S., Tan Y. P., Lim H. N., Tan W. T., Mahnaz M. A., Talib Z. A., et al. J. Appl. Polym. Sci., 2013, 128(1), 224-9.
(10) Dubal D. P., Patil S. V., Kim W. B., Lokhande C. D., Mater. Lett. 2011, 65(17-18), 2628-31.
(11) Saidman S. B. J. Electroanal. Chem. 2002, 534(1), 39-45.
(12) Bazzaoui M., Martins J. I., Bazzaoui E. A., Reis T. C., Martins L., J Appl. Electrochem., 2004, 34(8), 815-22.
(13) Dai Y., Zhu F., Zhang H., Ma H., Wang W., Lei J., Int. J. Electrochem. Sci., 2016, 11(5), 4084-91.
(14) del Valle M. A., Gacitúa M., Díaz F. R., Armijo F., Río R del., 2009, 11(11), 2117-20.
(15) Valaski R., Canestraro C. D., Micaroni L., Mello R. M. Q., Roman L. S., Sol. Energy Mater. Sol. Cells. 2007, 91(8), 684-8.
(16) Zhang J., Shi G., Liu C., Qu L., Fu M., Chen F., J Mater Sci. 2003, 38(11), 2423-7.

Conducting Polymers

Conducting polymers (CPs) are conjugated polymers where the back-bone of the molecular structure consists of alternating single and double bonds, leading to x-electron conjugation that results in inherent conductivity. Conductivity can be further enhanced by either partial oxidation with electron acceptors or partial reduction with electron donors. This doping process introduces defects such as polarons and bipolarons which are then available as charge carriers. Analyte species can interact with conducting polymers via doping or dedoping mechanisms, thereby causing a change in the CP conductivity.

The plurality of conducting polymer molecules 18 (see, e.g. FIG. 2) may be selected from a polyphenylene, a polyparaphenylene, a polyparaphenylene vinylene, a polyparaphenylene acetylene, a polyazulene, a polynaphthalene, a polypyrene, a polyaniline, a polyparaphenylene sulphide, a polyfluorene, a polypyrrole, a polythiophene, a polycarbazole, a polyindole, a polyazepine, or a mixture thereof.

The plurality of conducting polymer molecules may be selected from a polyphenylene, a polyparaphenylene, a polyparaphenylene vinylene, a polyparaphenylene acetylene, a polyazulene, a polynaphthalene, a polypyrene, a polyaniline, a polyparaphenylene sulphide, a polyfluorene, a polypyrrole, a polycarbazole, a polyindole, a polyazepine, or a mixture thereof.

The plurality of conducting polymer molecules may comprise a doped CP selected from polypyrrole (PPy), polyaniline (PAni) and poly(3,4-ethylenedioxythiophene) (PEDOT).

At least 90% (90% to 100%) of the plurality of conducting polymer molecules may be electrically connected to the first electrode and/or the second electrode. By electrically connected, it is intended that the conducting polymer molecules 18 may be directly or indirectly bonded (e.g. as shown in FIG. 2b via a conductive node 16) to an electrode. Electrochemical growth means that the polymer can only grow from the monomer in areas connected to the electrodes, e.g. where the potential exceeds the oxidation potential. As such, all of the electrochemically grown conducting polymers are electrically connected to the first electrode and/or the second electrode. At least 92%, at least 95%, at least 97%, at least 98% or at least 99% of the plurality of conducting polymer molecules may be electrically connected to the first electrode and/or the second electrode.

Some of the conducting polymer molecules may be connected to the first electrode only and some of the conducting polymer molecules may be connected to electrode only. However, ideally, a high proportion of the plurality of conducting polymer molecules is electrically connected to both the first electrode and to the second electrode (which may be via conductive nodes). For example at least 5%, at least 10%, at least 15%, at least 20%, at least 30%, at least 40%, at least 50%, at least 60%, at least 70%, at least 80%, at least 90% or at least 95% of the plurality of conducting polymer molecules are electrically connected to both the first and the second electrodes.

Electrodes and Insulating Substrate

An insulating substrate 14 (e.g. glass or insulating polymer) is disposed between the first and second electrodes 11, 12, i.e. at least one pair of electrodes. See, e.g., FIG. 2b.

The first and second electrodes may be separated from one another by a distance of 100 μm or less, 50 μm or less, 20 μm or less, 10 μm or less, 5 μm or less or 3 μm or less and/or the first and second electrodes may be separated from one another by a distance of 500 nm or more, 1 μm or more or 3 μm or more.

The first and/or second electrodes may be described with reference to their width. The first electrode and/or the second electrode may have a width of 100 μm or less, 50 μm or less, 20 μm or less, 10 μm or less, 5 μm or less or 3 μm or less and/or the first electrode and/or the second electrode may have a width of 500 nm or more, 1 μm or more or 3 μm or more.

The (mean) distance between the first and second electrodes may be compared to the mean thickness of the first and second electrodes. The (mean) distance between the first and second electrodes may be from 20 to 500%, from 50 to 200% or from 75 to 125% of the (mean) width of the first and second electrodes.

The first electrode and the second electrode may independently comprise a metal selected from groups 3 to 16 of the periodic table of the elements, graphite, a conducting oxide, a conducting nitride, a conducting carbide or a mixture thereof.

The first electrode and the second electrode may independently comprise platinum, palladium, copper, gold, silver, zinc, indium tin oxide, graphite or a mixture thereof.

The first electrode and the second electrode may be interdigitated, i.e. the first and second electrode may comprise an interdigitated electrode (IDE).

The insulating substrate may comprise magnesium oxide, strontium titanate, beryllium oxide, aluminium oxide, aluminium nitride, silicon oxide or a mixture thereof. The insulating substrate may comprise a flexible or rigid electrically insulating polymer.

The process for producing the sensor component may employ the first and second electrodes as a working electrode in a three electrode cell, together with a counter electrode (e.g. a Pt coil) and a reference electrode (e.g. Ag/AgCl).

A plurality of conductive nodes 16 may be disposed on a surface of the insulating substrate (i.e. they are present prior to electropolymerisation). See, e.g. FIG. 2b. As such the process of the first aspect may comprise an initial step of disposing a layer of a conductive node material on a surface of the insulating substrate wherein the conductive node material wets the surface and connects the electrodes; and dewetting the layer of conductive node material to form isolated nodes of the conductive node material on the insulating substrate.

The plurality of conductive nodes may comprise a metal selected from groups 3 to 16 of the periodic table of the elements, a conducting oxide, a conducting nitride, a conducting carbide, a conducting organic compound or a mixture thereof.

As shown in the examples, the use of conducting nodes increases the sensitivity of the sensor. The inventors employed a strategy of pre-patterning the glass insulating substrate with Au nanoparticles. Without being bound by theory, it is proposed that the nanoparticles act as fresh nucleation centres, increasing the ability of the network to spread.

The plurality of conducting nodes has a mean height. The height (maximum thickness) of a conductive node may be defined as the distance between the surface of the insulating substrate on which the node is disposed and the upper surface of the node. Usually, the height of the conductive nodes disposed on the surface of the insulating substrate, is equal to or less than 500 nm. Typically, the height of the conductive nodes is from 0.3 nm to 200 nm. The height may for instance be from 5 nm to 100 nm, or preferably from 20 nm to 40 nm. The height can be measured by scanning electron microscopy (SEM) or atomic force microscopy (AFM).

The percolation network has a mean thickness of the order of a single polymer molecule, which is smaller that the height of a node.

Detection of an Analyte

The percolation network displays a change in an electrical property in response to interaction with an analyte. For example, the electrical property may be resistance, impedance, capacitance, permeability, permittivity, magneto-resistivity or dielectric strength.

The analyte may be a gaseous analyte, such as ammonia.

The examples demonstrate high sensitivity to ammonia in the low ppb range. The inventors propose an electronic nose that employs multiple percolation sensors made from different CPs or that have different active functional groups that would preferentially bind specific molecular species. Such a device with multiple sensors would use pattern recognition to distinguish different analytes.

substrates decorated with gold nanoparticles between the electrodes and (b) for plain substrates between the electrodes.

Figure 7:
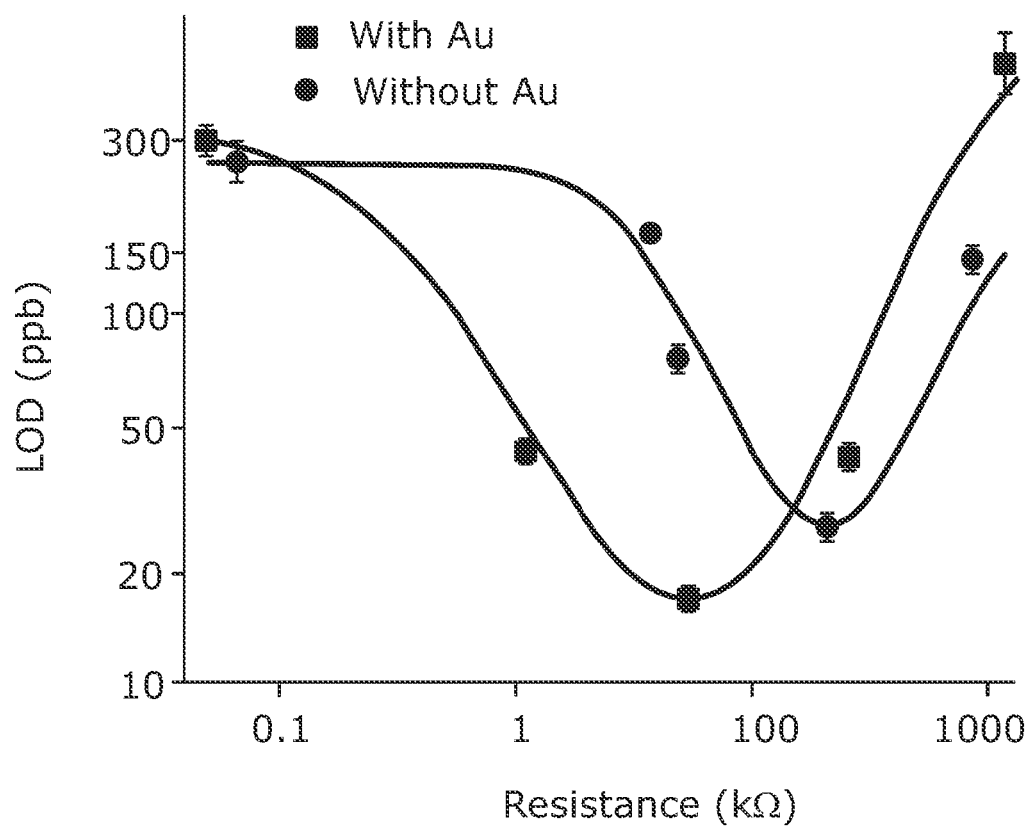

FIG. 7 is a graph showing the limit of detection (LOD) for ammonia gas versus PPy percolation network resistance for nanoparticle-decorated substrates between the electrodes (squares) and plain substrates between the electrodes (circles). The curves are drawn as a guide to the eye in the semi-logarithmic plot.

Figure 8:
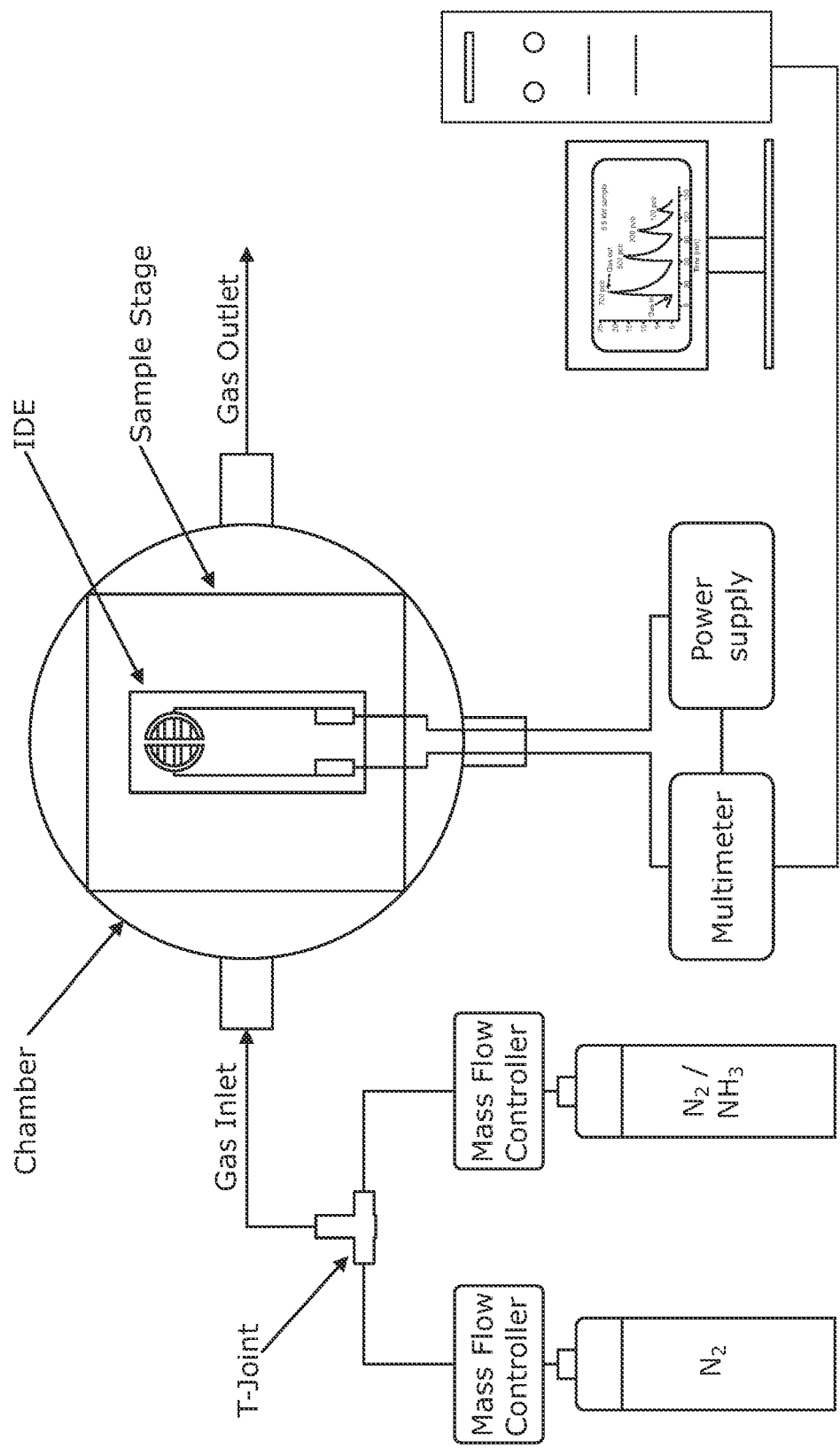

FIG. 8 is a schematic layout of the ammonia gas sensing rig used for ammonia gas sensing experiments.

DETAILED DESCRIPTION OF THE INVENTION

Examples

Pt interdigitated electrodes on glass substrates were purchased from Micrux (Spain). Each interdigitated electrode contained 180 pairs of 5 μm wide electrodes separated by a gap of 5 μm. Interdigitated electrodes were cleaned with concentrated nitric acid ($HNO_3$, 90%) then sonicated in methanol ($CH_3OH$, 99.9%), ethanol ($C_2H_5OH$, 99.8%) and acetone ($C_3H_6O$ 99.8%) for 10 minutes each prior to use. All solvents were purchased from Sigma-Aldrich UK.

Au films of 5 nm were deposited at a rate of 0.2 Å/s using a Knudsen-cell in an ultra-high vacuum chamber with a base pressure of $10^{-8}$ Pa. Average layer thickness was continuously monitored throughout deposition using a quartz crystal microbalance. The layer was annealed at 200° C. for 1 h. This thermal evaporation in ultra high vacuum (UHV) followed by an annealing step that causes dewetting results in dispersed nanoparticles on the glass substrate (Lefferts et al. Appl. Phys. Lett. 112, 251602 (2018)).

All electrochemical experiments were performed using a PGSTAT204 Autolab potentiostat (Methrohm, UK) interfaced to a PC with NOVA version 1.11 software. Pyrrole (Py, 98%), lithium perchlorate ($LiClO_4$, 95%) and acetonitrile ($CH_3CN$, 99.8%) were purchased from Sigma-Aldrich UK. A three electrode cell was employed with a Pt coil (BASi, USA) as the counter electrode. An Ag/AgCl (CH Instruments, USA) reference electrode was used. The electrodes of the interdigitated electrode were connected and used as the working electrode.

For the electrochemical growth of polypyrrole, 0.1 M pyrrole was prepared in 0.1 M $LiClO_4$/acetonitrile and a potentiostatic method was used. The potential was stepped up to 1 V from 0 V and held for various periods. After deposition the substrates were put back in monomer-less solution (0.1 M $LiClO_4$/acetonitrile) and held at 1 V for 60 s to p-dope the polypyrrole.

After p-doping, the substrates were allowed to dry in air after washing with acetonitrile. DC resistance measurements were made between the interdigitated electrodes by applying a voltage of 1 V and measuring the resulting current.

FIG. 8 shows a schematic of the gas sensing rig used for the ammonia gas sensing experiments. Ammonia gas (10 ppm, nitrogen fill) and $N_2$ gas (for further dilution of $NH_3$) were purchased from BOC gases UK. The flow rates from the respective gas cylinders were controlled by digital mass flow controllers (Alicat, USA) which flow into a Swagelok T-joint to ensure mixing of the gases before entering the inlet of the gas chamber. The percolation sensors are placed on a sample stage in the chamber with electrical connections running from inside the chamber to a multimeter and power supply outside. The sensing chamber is first purged with nitrogen gas for 45 minutes to remove any impurities present in the chamber or in the sensing layer on the interdigitated electrodes. Then a voltage of 1 V is applied to the two electrodes and the current is monitored as a function of time on a computer equipped with Benchvue software. Once a stable baseline is reached different concentrations of ammonia gas are introduced into the system. The ppb concentration of ammonia gas that was introduced into the sensing chamber was calculated by the relative flowrates of the two mass flow controllers while always maintaining a constant flow rate of 500 standard cubic centimetres per minute (sccm).

Example 1—Chronoamperometric Growth of Percolation Networks

Figure 2:
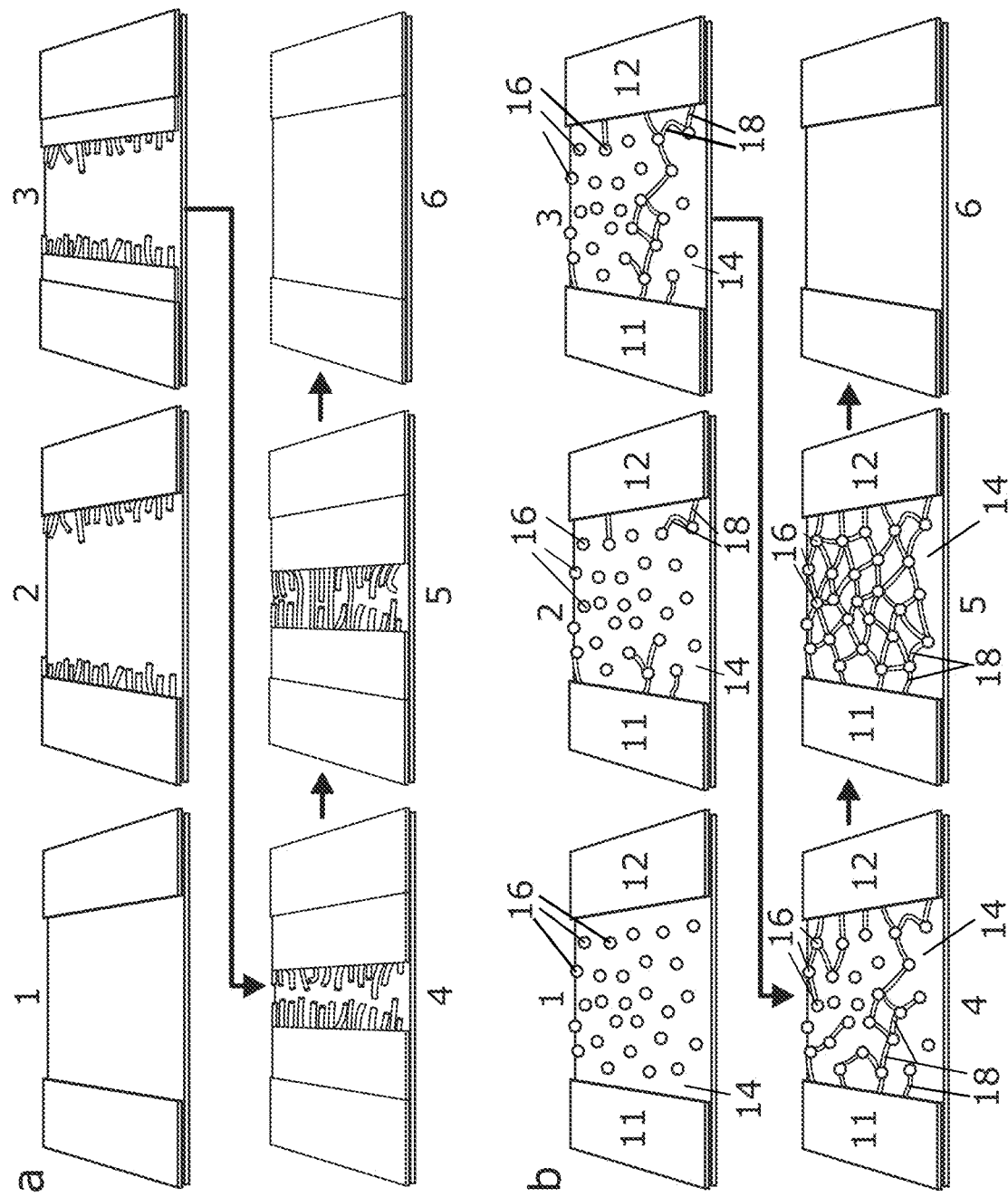
FIG. 2 is a schematic diagram of the stages of electrochemical growth of a conducting polymer from the monomer solution. In (a) the polymer growth fronts advance towards each other and a few strands meet at the percolation threshold (panel 5). In (b) gold nanoparticles act as nucleation centres and the percolation threshold has been reached in panel 3.

To create the CP networks shown in FIG. 2 chronoamperometric growth for transient times between 5 s and 70 s, followed by p-type doping, was carried out for plain electrodes and electrodes decorated with gold nanoparticles.

Figure 3:
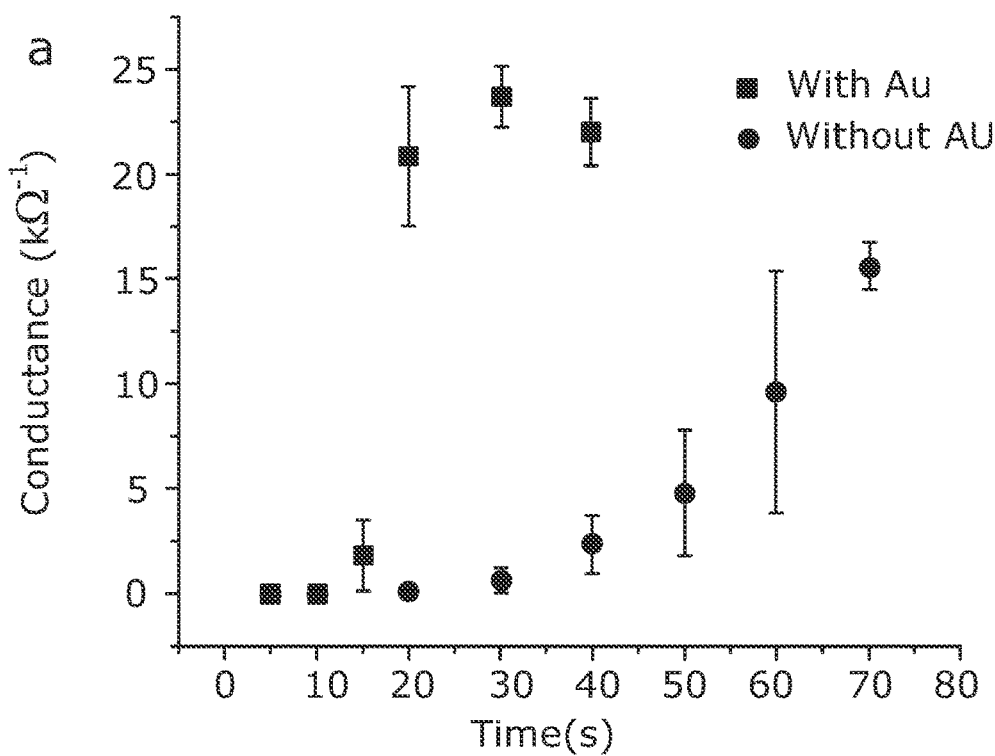
FIG. 3 is a linear plot of conductance as a function of chronoamperometric transient time for plain substrates between the electrodes (circles) and substrates between the electrodes that have been decorated with gold nanoparticles (squares).

The electrical conductance was determined by applying a dc potential of IV between the interdigitated electrodes and measuring the current (FIG. 3). It will be understood that the resistance (R) of an object is defined as the ratio of voltage across it (V) to current through it (I), i.e. R=V/I while the conductance (G) is the reciprocal, i.e. G=1/R.

Figure 1:
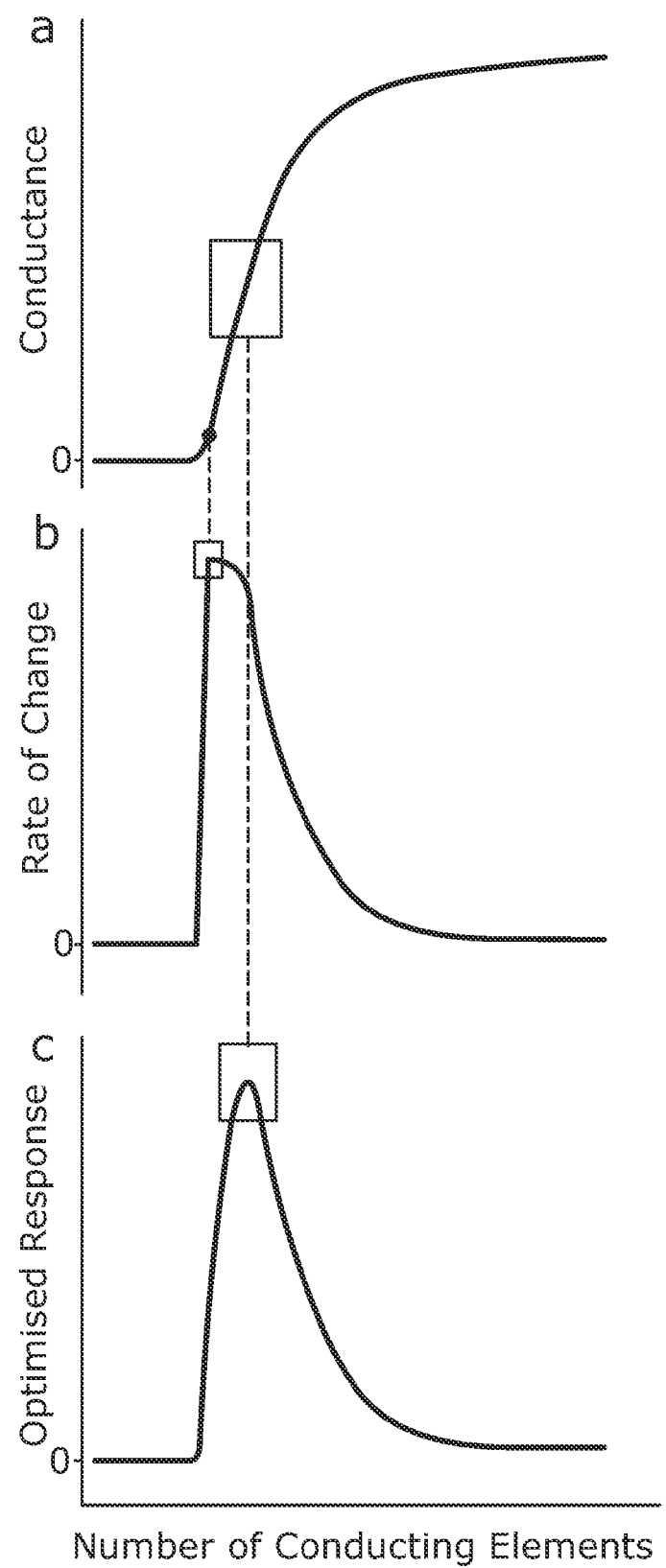
FIG. 1 is a diagram containing conceptual graphs for a percolation network showing the relationship between electrical property of the network and the number of conducting elements in the network.
Figure 4:
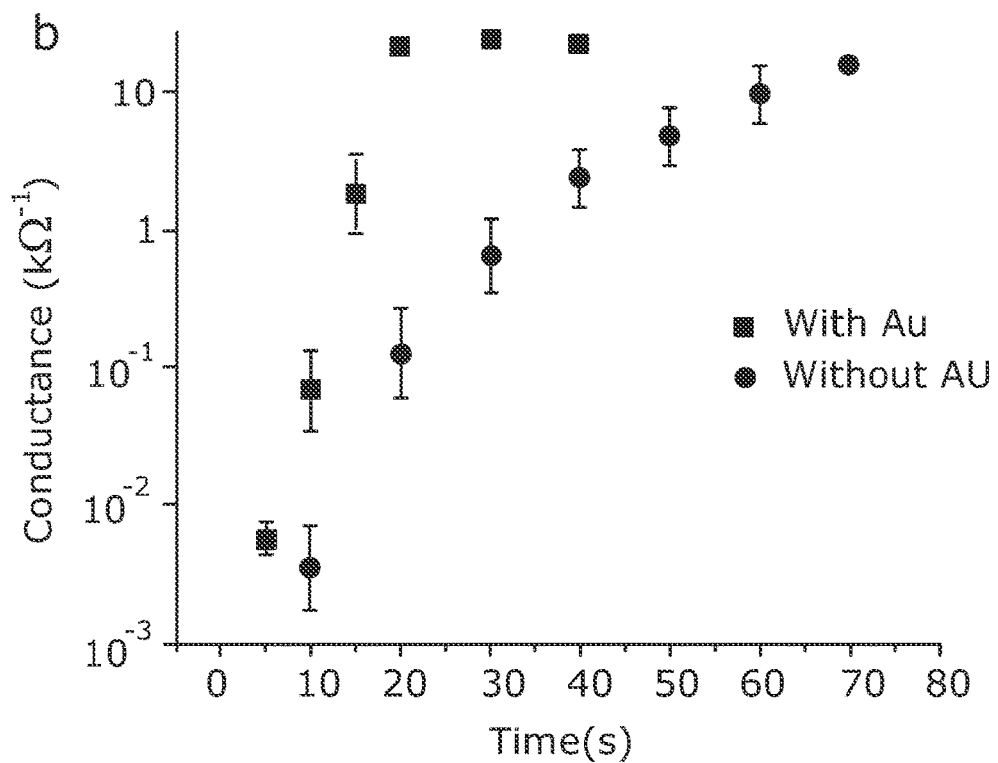
FIG. 4 is a logarithmic plot of conductance as a function of chronoamperometric transient time for plain substrates between the electrodes (circles) and substrates between the electrodes that have been decorated with gold nanoparticles (squares).

For the plain electrodes (FIG. 3 and FIG. 4, circles) it can be seen that there is no appreciable increase in conductivity until 40 s, which is equivalent to the beginning of the percolation region in FIG. 1 and FIG. 2a (panel 5). As more CP is grown, so the conductivity between the electrodes increases until a continuous thin film is created.

Conversely, for the nanoparticle-decorated electrodes (FIG. 3, squares) a jump in conductivity already occurs at 15 s, corresponding to panel 3 in FIG. 2 b, and there is a further significant increase at 20 s. Beyond 20 s there is no appreciable increase in conductivity, presumably because once all the nanoparticles have been electrically connected a thick film of CP is required for any further substantial impact.

Example 2—Ammonia Gas Sensing

The polypyrrole percolation networks of Example 1, having various degrees of connectivity, were tested for their performance in the gas sensing rig (FIG. 8). Ammonia was used as the analyte.

Figure 5:
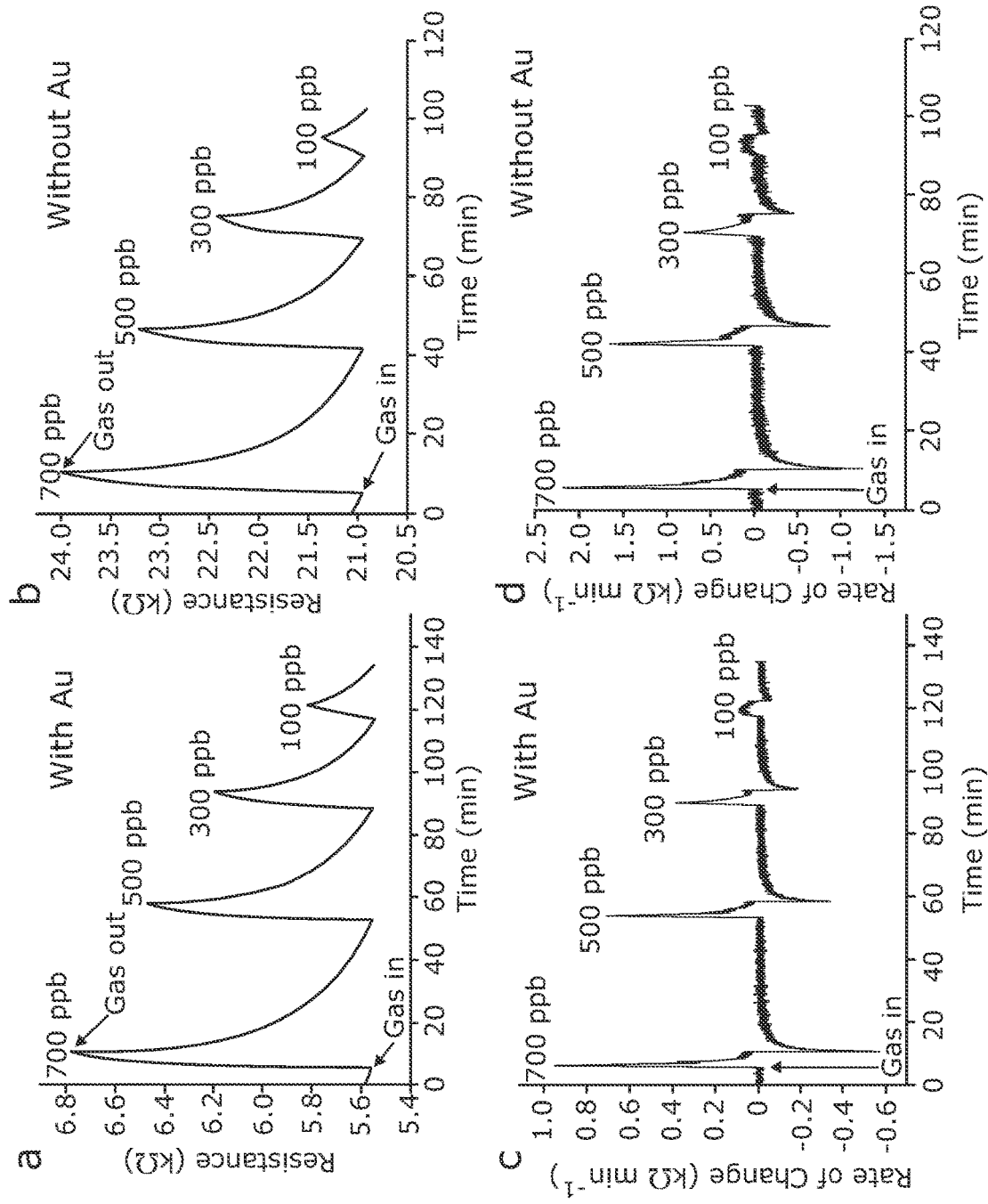
FIG. 5 shows chemiresistive responses of doped PPy percolation networks to ammonia in a dry nitrogen carrier gas. In (a) a gold-decorated substrate between the electrodes is used with a starting resistance of 5.5 kΩ, and in (b) a plain substrate between the electrodes is used with a starting resistance of 20.9 kΩ. The gradients of the curves in (a, b) are shown in (c, d), respectively.

Typical sensing responses from 700 parts per billion (ppb) to 100 ppb are shown in FIG. 5 for a 5.5 kΩ network with Au particle-decorated electrodes (FIG. 5a), and a 20.9 kΩ network with plain electrodes (FIG. 5b). The effect of 100 ppb ammonia exposure can be seen in both the response curves. Numerous sensors with a broad range of electrical resistances were created and these were evaluated using a testing protocol of 5 minutes of ammonia exposure in a dry nitrogen carrier gas, followed by dry nitrogen exposure until the sensor baseline was restored, which was typically in less than 30 mins, but was substantially shorter for low concentrations of ammonia.

The maximum rate of change of the sensor as a function of analyte exposure is multiplied by 3, representing 3 standard deviations, or a 99% confidence interval, to arrive at a number for the limit of detection (LOD).

The gradients of the sensor response curves are shown in FIG. 5c,d with the peaks of the spikes corresponding to the greatest rates of change. These peaks are unambiguously associated with sensor performance as they do not depend on the duration of analyte exposure.

Each sensor with a different level of network connectivity will have a different maximum rate of change response, with the networks at the percolation threshold showing the greatest sensitivity (FIG. 1b). However the percolation threshold networks will also suffer from the greatest noise levels. Ultimately, we are interested in optimising the signal to noise ratio of the sensor (FIG. 1c). So rather than plotting the spike heights in FIG. 4c,d, we divide these heights by the root mean square of the noise measured for the individual sensors. These results are shown in FIG. 6 as a function of analyte concentration.

FIG. 6a shows that the sensor with the steepest gradient, and hence the optimum performance, is the 5.5 kΩ network. For lower network connectivity the 25.5 kΩ and 119.4 kΩ sensors have higher sensitivity, but greater noise levels. Conversely, the networks with greater connectivity (1.1 kΩ and 49.1Ω) have lower noise levels, but also lower sensitivities. The 49.1Ω sensor is in effect operating at maximum connectivity, is not a percolation network, and can be thought of as a thin film device.

Data from the chemiresistive percolation sensors with plain electrodes is shown in FIG. 6b, which also shows that the optimum sensor with the highest signal to noise ratio response lies in a region of the percolation curve that is a little beyond the percolation threshold (box in FIG. 1a).

Figure 6:
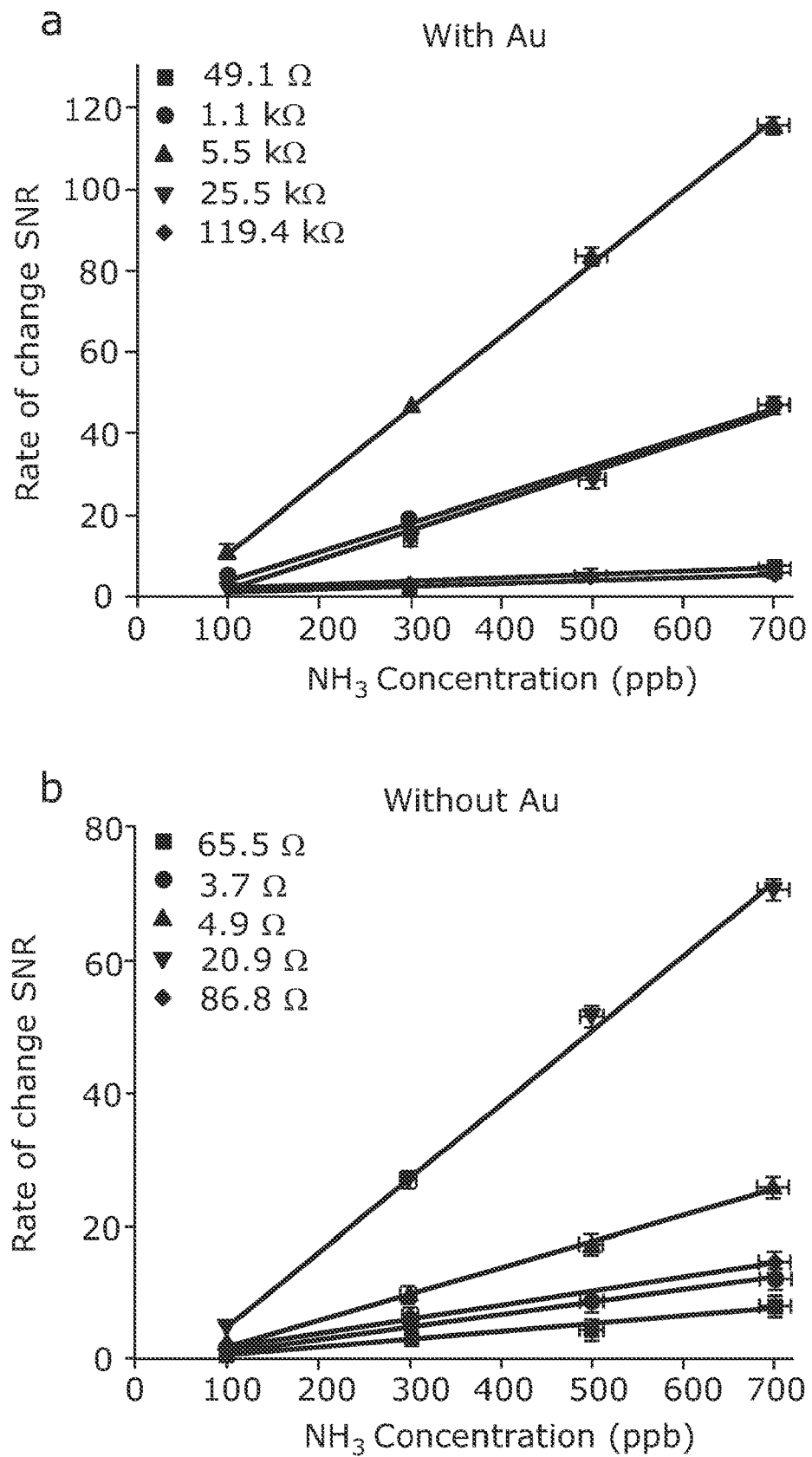
FIG. 6 shows the rate of change of the signal to noise ratio responses to different concentrations of ammonia of percolation networks with different levels of connectivity for (a)

The LODs can be calculated straightforwardly from the linear fits in FIG. 6 and are defined as the point where the signal is a factor of 3 greater than the noise. The LOD for each sensor is plotted against resistance in FIG. 7. This figure shows that a more effective percolation device is created when using an Au nanoparticle scaffold (minimum LOD of 18±2 ppb in FIG. 7 curve) than without (minimum LOD of 27±5 ppb in FIG. 7 curve).

CONCLUSION

The results demonstrate that the inventors have electrochemically grown doped PPy percolation networks between interdigitated electrodes on glass substrates, and that these networks can be used for high sensitivity ammonia sensing. The strategy of pre-patterning the glass with Au nanoparticles improves the sensitivity and it is proposed that the nanoparticles act as fresh nucleation centres, increasing the ability of the network to spread. The ideal level of network connectivity for high sensitivity gas sensing is just beyond the percolation threshold where the SNR is optimised. In this region the LOD of 18±2 ppb is better by a factor of 20 compared with thin film devices made with the same CP.

The invention claimed is:

1. A process for producing a sensor component for detecting an analyte, the process comprising:
providing an insulating substrate disposed between a first electrode and a second electrode wherein a plurality of conductive nodes are disposed on a surface of the insulating substrate;
providing a monomer electrolyte solution, the monomer electrolyte solution comprising a plurality of monomer molecules capable of electrochemical growth to form a plurality of conducting polymer molecules;
electrochemically growing a plurality of conducting polymer molecules from the monomer electrolyte solution, the plurality of conducting polymer molecules being grown on a surface of the insulating substrate to electrically connect the first electrode to the second electrode, wherein at least some of the plurality of the conducting polymer molecules grown are bonded to one or more of the plurality of conductive nodes such that electrical junctions are formed by conducting polymer molecules grown on the surface of the insulating substrate between one or more of the conductive nodes and at least one of the first and second electrode, providing a percolation network that electrically connects the first electrode to the second electrode; the conducting polymer molecules being capable of displaying a change in an electrical property in response to interaction with an analyte; and
ceasing electrochemical growth of the conductive polymer molecules;
wherein cyclic voltammetry is not employed to grow the plurality of conducting polymer molecules.

2. The process of claim 1, wherein a potentiostatic method or a galvanostatic method is employed to grow the plurality of conducting polymers polymer molecules or wherein chronoamperometry is employed to electrochemically grow the plurality of conducting polymers polymer molecules.

3. The process of claim 1, wherein an average potential of at least +0.5V is applied to the first electrode and/or the second electrode to effect electrochemical growth of the plurality of conducting polymer molecules.

4. The process of claim 1, wherein the plurality of monomer molecules comprise a phenylene, a vinylene, an acetylene, an azulene, a naphthalene, a pyrene, an aniline, a fluorene, a pyrrole, a thiophene, a carbazole, an indole, and/or an azepine or wherein the plurality of conducting polymer molecules are selected from a polyphenylene, a polyparaphenylene, a polyparaphenylene vinylene, a polyparaphenylene acetylene, a polyazulene, a polynaphthalene, a polypyrene, a polyaniline, a polyparaphenylene sulphide, a polyfluorene, a polypyrrole, a polythiophene, a polycarbazole, a polyindole, and/or a polyazepine.

5. The process of claim 1, wherein the percolation network is doped by exposure to an electrolyte solution that does not comprise a plurality of monomer molecules capable of electrochemical growth to form a plurality of conducting polymer molecules.

6. A sensor component producible by the process of claim 1.

7. A device comprising the sensor component of claim 6, and detection means capable of detecting a change in an electrical property of the sensor component due to the interaction of an analyte with the plurality of conducting polymers.

8. A device comprising the sensor component of claim 6, and detection means capable of detecting a change in an electrical property of the sensor component due to the interaction of an analyte with the plurality of conducting polymers.

9. The process of claim 1, wherein the first electrode and the second electrode independently comprise a metal selected from groups 3 to 16 of the periodic table of the elements, graphite, a conducting oxide, a conducting nitride, a conducting carbide or a mixture thereof.

10. The process of claim 9, wherein the first electrode and the second electrode independently comprise platinum, palladium, copper, gold, silver, zinc, indium tin oxide, graphite or a mixture thereof.

11. The process of claim 1, wherein the first electrode and the second electrode are interdigitated.

12. The process of claim 1 additionally comprising one or more further electrodes.

13. The process of claim 1, wherein the insulating substrate comprises magnesium oxide, strontium titanate, beryllium oxide, aluminium oxide, aluminium nitride, silicon oxide or a mixture thereof.

14. A sensor component for detecting an analyte comprising:
- a first electrode and a second electrode;
- an insulating substrate disposed between the first electrode and the second electrode;
- a plurality of conducting polymer molecules, the conducting polymer molecules being capable of displaying a change in an electrical property in response to interaction with an analyte;
- a plurality of conductive nodes disposed on a surface of the insulating substrate;
- wherein at least some of the plurality of conducting polymer molecules are bonded to one or more of the conductive nodes such that electrical junctions are formed by conducting polymer molecules between one or more of the conductive nodes and at least one of the first and second electrode, thereby forming percolation network that electrically connects the first electrode to the second electrode; and
- wherein at least 90% of the plurality of conducting polymer molecules are electrically connected to the first electrode and/or the second electrode.

15. The sensor component of claim 14, wherein at least 5% of the plurality of conducting polymer molecules are electrically connected to both the first and the second electrodes.

16. A process for detecting an analyte, the process comprising:
- exposing a sample to a sensor component, wherein the sensor component comprises:
  - a first electrode and a second electrode;
  - an insulating substrate disposed between the first electrode and the second electrode;
  - a plurality of conducting polymer molecules, the conducting polymer molecules being capable of displaying a change in an electrical property in response to interaction with an analyte; and
  - a plurality of conductive nodes disposed on a surface of the insulating substrate;
  - wherein the plurality of conducting polymer molecules electrically connects the first electrode to the second electrode, and at least some of the plurality of conducting polymer molecules are bonded to one or more of the conductive nodes such that electrical junctions are formed by the polymer molecules between one or more of the conductive a nodes and at least one of the first and second electrode forming a percolation network that electrically connects the first electrode to the second electrode; and at least 90% of the plurality of conducting polymer molecules are electrically connected to the first electrode and/or the second electrode; and
- measuring a change in an electrical property of the percolation network.

17. The process of claim 16, wherein the electrical property is conductance.

18. The process of claim 16, wherein the analyte is ammonia.

* * * * *